May 20, 1969      G. RODER      3,445,102

CUTTING TORCH CARRIAGE MOUNT

Filed Sept. 22, 1966      Sheet 1 of 3 ns Patent Office 3,445,102
Patented May 20, 1969

1

3,445,102
CUTTING TORCH CARRIAGE MOUNT
Georg Roder, Frankfurt am Main-Fechenheim, Germany, assignor to Messer Griesheim G.m.b.H., Frankfurt am Main, Germany, a corporation of Germany
Filed Sept. 22, 1966, Ser. No. 581,259
Claims priority, application Germany, Sept. 24, 1965,
M 66,760
Int. Cl. B23k 37/02
U.S. Cl. 266—23                                    5 Claims

ABSTRACT OF THE DISCLOSURE

A cutting torch carriage has a ball bearing mount which comprises a support with an endless ball bearing race. The race has a straight section and its ends are connected by a curved section with ball bearings being therein. A cover substantially completely encloses the race and the support but exposes the external ball bearings along the straight race section. The bearing mount rests against a straight trackway by engagement of the exposed external ball bearing faces.

---

The present invention relates to mounts for cutting torch carriages.

In the usual cutting torch machines a plurality of cutting torches, each mounted on its own little carriage, is slidable along a trackway on a large carriage which in turn is mounted on rails that run at right angles to the trackway. In this way by combining movements of the large carriage with the upper carriages the individual cutting torches can be traced in any desired path across a workpiece. The guidance of the carriages along their trackway or rails should be effected as smoothly and accurately as possible in order for the cutting action to be acceptable.

Unfortunately the cutting action creates so much dust, fumes, ash, or the like, that it is difficult to properly maintain the accurately slidable condition of the mounts for the various carriages.

Among the objects of the present invention is the provision of improved carriage mounts that require very little maintenance.

The foregoing as well as other objects of the present invention will be more fully understood from the following description of several of its exemplifications, reference being made to the accompanying drawings wherein.

Figure 1:
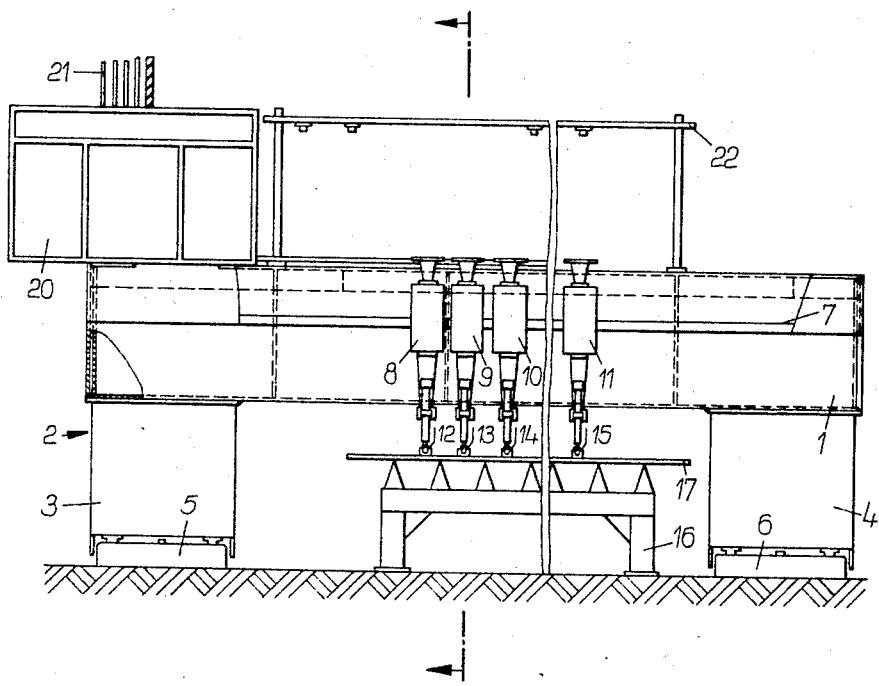
FIG. 1 is a front elevation of a cutting torch machine typical of the present invention.

According to the present invention a cutting torch carriage has a ball bearing mount comprising a support with an endless ball bearing race including a straight race section the ends of which are connected by a curved race section, ball bearings in the race, a cover substantially completely enclosing the race and the support but exposing external faces of the ball bearings along the straight race section, and a straight trackway against which the mount

2 rests by engagement of said exposed external ball bearing faces.

The mount and the trackway can be further protected by enclosing them in a space sealed by a liquid trap.

In a preferred form the trackway of the present invention is a ball bearing receiving groove in the track, the groove faces essentially horizontally and the mount is positioned so that anything dropping downwardly on the exposed ball faces is also free to drop down from those faces and away from the trackway.

The foregoing carriage mounts can be used for either the small torch carriages or the large carriage or preferably for both.

In the drawings the number 1 refers to a main carriage beam constructed in the form of an elongated panel, and 2 refers to the entire carriage that includes the panel 1 and is carried by two pedestal supports 3 and 4. The two supports 3 and 4 are movably mounted with respect to horizontally extending guide rail assemblies 5 and 6. Panel 1 also carries a track 7 that extends transversely of the guide rail assemblies 5 and 6 and movably holds four cutter carriages 8, 9, 10, and 11. Each cutter carriage carries an oxyacetylene torch 12, 13, 14, and 15 respectively. When in use the torches are directed towards a workpiece such as 17 held on work bench 16. The movement of the cutters is controlled by orthogonal co-ordination between travel on the guide rail assemblies 5 and 6 on the one hand, and rail 7 on the other.

A switchboard 20 may be provided for the operation of electrical and other appliances, which in part are inside the panel 1, but are not shown in the drawing. 21 designates gas inflow pipes and 22 designates supports for the gas inflow pipes and the like, which are attached to the panel.

Two parallel elongated tanks 30 and 48 are provided for the respective guide rail assemblies 5 and 6. The tanks 30 and 48 are cemented into the floor and hermetically sealed at each of their longitudinal ends. One sealed end is shown at 120 in the rear of FIG. 3. Along the length of guide rail assembly 5 is a rail 38 which stretches the whole length of tank 30 and is held in place by means of setscrews 113 and 114. These setscrews serve to keep the rail 38 level and to this end are screwed to a plate 32 which is welded to the tank 30. The screws are in turn locked by nuts 115 and 116 respectively. Other setscrews of this type can be distributed over the entire length of the rail.

Figure 3:
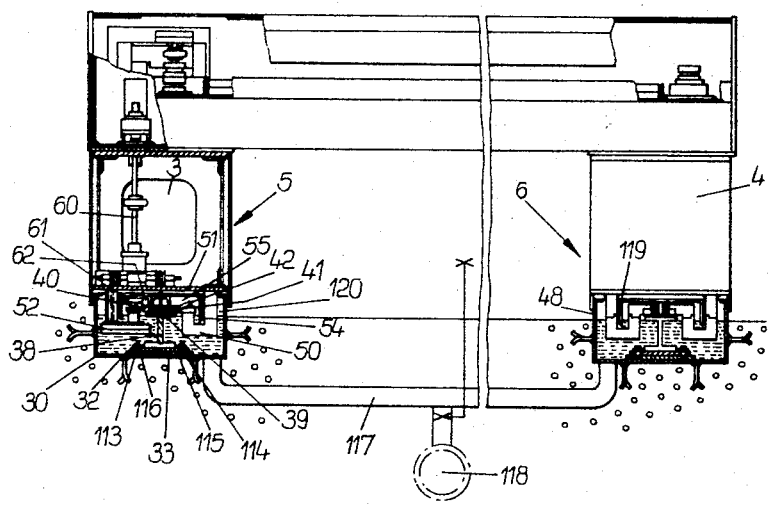
FIG. 3 is essentially a vertical sectional view taken at right angles to that of FIG. 2 and showing another form of carriage mount pursuant to the present invention.

Rail 38 has an essentially double T profile and at each side of its head 39 has parallel track grooves 40 and 41 respectively. Ball-bearing mounts 42 are movably fitted into these tracks 40, 49, and are secured to the support pedestals 3, 4. Only the ball-bearing mount 42 for track 41 is illustrated in FIG. 3.

Figure 4:
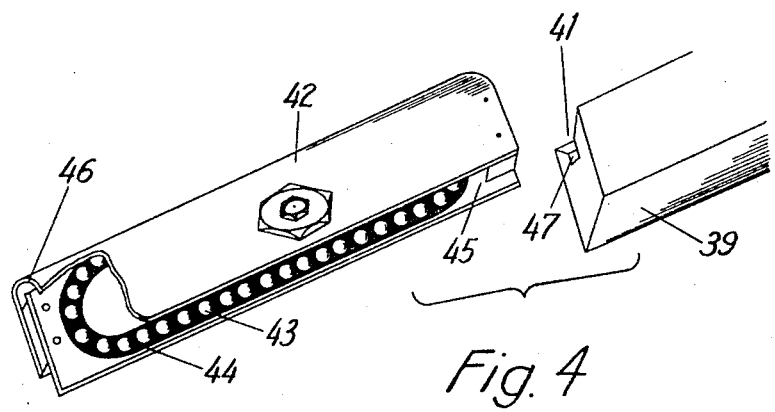
FIG. 4 is an exploded view of the carriage mount of FIG. 3 with a portion broken away to better show detail.

FIG. 4 gives a better view of mount 42 and of its mounting arrangement. This mount has an inverted U-shaped shroud 46 between the arms of which is fixed a guide sheet 45 provided with a recessed endless ball race 44 for a row of even-sized ball bearings 43. The shroud 46 is secured to the sheet 45 and holds the sheet so spaced from the arms of the shroud that these arms keep the balls in place in the track 44. The shroud is also secured to its carriage pedestal, as explained below. The internal support for the ball race in sheet 45 can be a block secured to one or both arms of the shroud.

Guide sheet 45 projects down beyond the lower end of the shroud 46, and is received in a groove 47 in its track 41. The bearings of the ball-bearing segment engage tapered bearing faces on each side of groove 47 over which they roll when the carriage is moved on its track assemblies. Shroud 42 further protects the bearing from any foreign solid particles that do manage to find their way into the bearing zone.

The ball-bearing mounts 42 are fixed to the short arms of J-shaped supports 50, 52, which in turn are fixed by their longer arms to a plate 51 at the bottom of each carriage pedestal. The supports are positioned with their shorter arms facing each other and most of the space between their longer arms is spanned by a tank cover 54 which is secured to the rail head 39 between the track grooves 40, 41. Cover 54 has down-turned flanges along each longitudinal edge and these edges dip down into the liquid in each tank between the arms of each J-shaped support. Cover 54 also extends from one end of the tank 30 to the other and is hermetically sealed at each end as by a gasketed joint or welding. The sides of the rail tanks extend up higher than the tracks 40 and 41 so that the tanks can be filled with a liquid to such an extent that the lower edges of the flanges of the cover 54 dip into the surface of the liquid, as explained above. In this way a sealed space 55 is created by the surface of the liquid, the cover 54, the sides and the two ends of the tank 30. The tracks 40 and 41 and the ball-bearing mounts are in this sealed space and thus protected against the outside amtosphere as well as the penetration of dust.

Two or more spaced ball-bearing mounts 42 can be used with each track, if desired. The two tanks 30 and 48 can also be connected by a communicating conduit 117 which is attached to a common liquid supply and drainage conduit 118. The most advantageous liquid to be used is one that does not affect the structures it engages and is not flammable. Water is a particularly desirable liquid as for example when the ball bearings and the rail assemblies are made of stainless steel.

Where the rail supports are such that carriage 2 is securely held against tilting or twisting, it is sufficient to provide the carriage propulsion along the rails from only one side of the carriage. This can be effected as by a motor, not shown, which rotates a vertical shaft 60 journalled in the pedestal. By rotating the shaft in one direction or the other, a pinion 61 on its lower end engaged with a toothed rack fixed along rail 38, will smoothly propel the carriage.

The two support pedestals 3 and 4 only extend a short distance along the rails and in every position of the carriage 2 the greatest part of the rail tanks and covers 54, 119, remain exposed. These covers are accordingly easily made removable as by having them screwed in place. Service personnel can thus have ready access to the internal portions of the rail assemblies. The slits between the tank tops and their covers can be dimensioned so that they are essentially narrower than a human foot in order to minimize accidents. Turned-in lips at the tops of the tank sides are a convenient way to adjust these slits.

Figure 2:
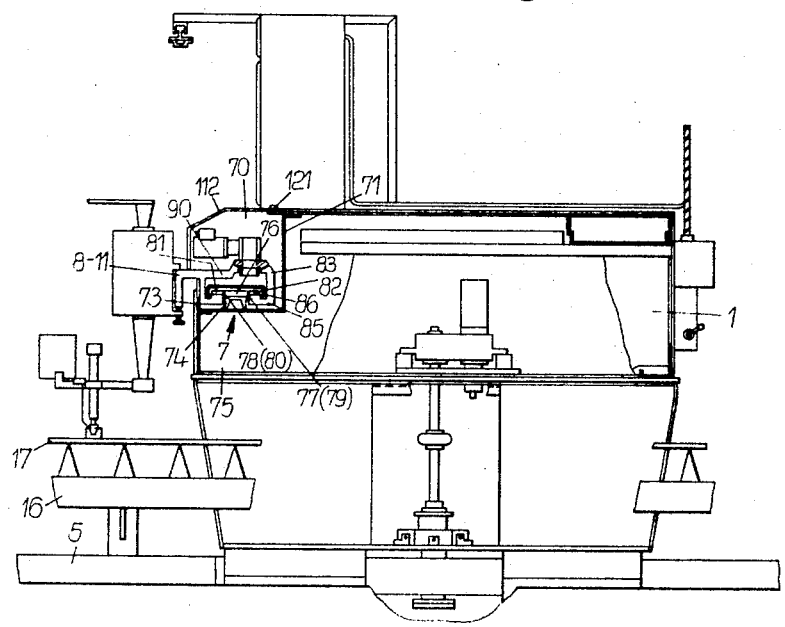
FIG. 2 is a sectional view taken along the line II—II of FIG. 1 showing one form of carriage mount pursuant to the present invention.

As will be seen in FIG. 2, the guiding arrangement for the torch carriages 8 through 11 is very similar to that for the main carriage 2. The beam panel 1 of the main carriage has an essentially rectangular cross-section with a recess 70 along the face adjacent the torches. This recess is separated from the remainder of the panel's interior by a metal angle 71 which can be welded in place, for example. The lower arm of this angle has its outer edge bent up to a lip 72 thereby forming a tank 74 in the lower portion of the recess 70. At each end of the carriage beam 1 tank 72 is securely closed as by a wall 75 of the beam.

Track 7 extends centrally along the bottom of tank 74 from one end of the main carriage to the other, and has a head 76 provided with bearing grooves 77, 78 facing out horizontally on each side. In each of these grooves 77, 78 is fitted ball-bearing mounts 81, 82 respectively. These mounts 81, 82 can each be identical to the construction shown at 42, 43, 44, 45 and 46 in FIG. 4, but can be scaled down in size somewhat if desired for the purpose of occupying less space in tank 74. Inasmuch as the individual torch carriages and their associated structures have only a fraction of the weight of the entire main carriage, the mounts for the former need only be a small fraction of the size of the mounts for the latter.

Further compactness is obtained in tank 74 by disposing each of mounts 81, 82 horizontally rather than obliquely, as they are shown in FIG. 3 for the mounts of the main carriage. Mounts 81, 82 are illustrated in FIG. 2 as secured to J-shaped flanges 84, 85 of a chassis 83 on which a torch is mounted and which can be moved as by an electric motor. The J-shaped flanges have their short arms facing each other and in the space between their long arms is fitted a cover 86 which is held on the top of the track 7 and has side edges bent down to dip into liquid contained in tank 74. These edges extend below the surface of the liquid while the mounts 81, 82 along with their grooves 77, 78 are located above the surface of the liquid and sealed by the liquid against contamination.

Additional protection for the track 7 can be provided by a shield 112 fitted over the top of tank 74. This shield is spaced above lip 72 so as to permit the mounting of the torch on the chassis 83. It is preferred to have the shield hang over beyond the lip 72, as illustrated. Readily removable screws 121 or the like can be used to hold the shield in place on the carriage panel 1 so that the shield can be conveniently removed when desired. It is also helpful to have the shield made in a plurality of separate sections each separately removable, although it is also effective to have the shield in one piece. Instead of removing the shield, as for example when a torch carirage is to be replaced, the shield may be hinged in place so that it only need be lifted up without having to unfasten any screws.

It is a further feature of the present invention that the ball bearings and their recesses are substantially completely covered as by the shroud 42. The only portions of the mount that is left directly exposed are the outer faces of the ball bearings in the straight portion of the race where the balls project for engagement in their track grooves. Notwithstanding the highly effective nature of the traps, foreign materials will tend to drop on the mounts and by having the foregoing mount construction practically all such dropping material will be prevented from reaching the ball bearings themselves or their recesses.

It is another feature of the present invention that the track grooves 40, 41, 77, 78 face substantially horizontally. By this orientation any particles that tend to fall into these grooves will be free to fall farther and drop away completely from the mount. Moreover, by setting the ball bearing carrying mounts in these grooves with the ball races horizontal or slightly tilted in an upward direction away from the grooves, any foreign object tending to fall on the exposed ball bearing faces will also be free to fall farther so that there will be no significant accumulation that would materially interfere with smooth ball bearing gliding of the carriages on their mounts.

By having the upper and lower carriages in each of the foregoing constructions, best results are obtained and the operating time between maintenance sessions is greatly increased.

Obviously many modifications and variations of the present invention are possible in the light of the above teachings. It is, therefore, to be understood that the invention may be practiced otherwise than as specifically described.

What is claimed:

1. A cutting torch carriage in combination with a cutting torch mounted on said carriage, said carriage having a ball bearing mount comprising a support with an endless ball bearing race including a straight race section the ends of which are connected by a curved race section, ball bearings in the race, a cover substantially completely enclosing the race and the support but exposing external faces of the ball bearings along the straight race section, and a straight trackway against which the mount rests by engagement of said exposed external ball bearing faces.

2. The combination of claim 1 in which the mount and the trackway are further protected by being enclosed in a space sealed by a liquid trap.

3. The combination of claim 1 in which the trackway is in the form of a ball bearing receiving groove in a track, the groove faces essentially horizontally and the mount is positioned so that anything dropping downwardly on the exposed ball faces is also free to drop down from those faces and away from the trackway.

4. The combination of claim 1 in which the trackway is carried by a large carriage along which the cutting torch carriage can be moved, and the large carriage is mounted on rails running transversely to the trackway by mounts corresponding to the cutting torch carriage mount.

5. The combination of claim 2 in which the trackway is carried by a large carriage along which the cutting torch carriage can be moved, and the large carriage is mounted on rails running transversely to the trackway by mounts corresponding to the cutting torch carriage mount.

References Cited

UNITED STATES PATENTS

| | | |
|---|---|---|
| 2,672,379 | 3/1954 | McVey. |
| 3,301,543 | 1/1967 | Semper. |
| 3,311,426 | 3/1967 | Binns. |
| 3,328,555 | 6/1967 | Dinter. |

OTHER REFERENCES

German printed application, No. 1,022,851, January 1958, Worm.

JOHN J. CAMBY, *Primary Examiner.*